United States Patent
Jordan

(12) 
(10) Patent No.: US 6,422,783 B1
(45) Date of Patent: Jul. 23, 2002

(54) BREAKAWAY POST SLIPBASE

(75) Inventor: Horace M. Jordan, Houston, TX (US)

(73) Assignee: Northwest Pipe Company, Houston, TX (US)

( * ) Notice: Subject to any disclaimer, the term of this patent is extended or adjusted under 35 U.S.C. 154(b) by 0 days.

(21) Appl. No.: 09/752,278

(22) Filed: Dec. 29, 2000

(51) Int. Cl.$^7$ .............................................. E01F 9/018
(52) U.S. Cl. ........................... 404/9; 52/98; 256/13.1; 403/2; 40/606; 40/607
(58) Field of Search .............................. 404/9, 10, 11; 49/49; 52/95, 98; 256/1, 65, 13.1; 40/606, 607, 608, 610; 403/2

(56) References Cited

U.S. PATENT DOCUMENTS

| | | | |
|---|---|---|---|
| 2,141,067 A | | 12/1938 | Miller |
| 3,499,630 A | * | 3/1970 | Dashio ....................... 256/13.1 |
| 3,637,244 A | * | 1/1972 | Strizki ........................... 52/98 |
| 3,967,906 A | * | 7/1976 | Strizki ........................ 256/13.1 |
| 4,021,977 A | * | 5/1977 | Deike ............................ 52/98 |
| 4,565,466 A | | 1/1986 | Daggs et al. |
| 4,923,319 A | * | 5/1990 | Dent ............................. 403/2 |
| 4,926,592 A | | 5/1990 | Nehls |
| 5,160,111 A | | 11/1992 | Hugron |
| 5,197,819 A | * | 3/1993 | Hughes ........................ 404/13 |
| 5,354,144 A | * | 10/1994 | Lizakowski .................. 404/10 |
| 5,782,040 A | * | 7/1998 | McCartan ....................... 52/98 |
| 5,885,443 A | * | 3/1999 | Faller et al. .................... 403/2 |
| 6,264,162 B1 | * | 7/2001 | Barnes et al. .................. 52/98 |

OTHER PUBLICATIONS

NCHRP Report 350 Evaluation of the Northwest Sign Company Slip Sign Support for Square Posts, Apr. 2000.
Letter to Unistrut Corporation, May 1, 1991.

* cited by examiner

Primary Examiner—Thomas B. Will
Assistant Examiner—Alexandra K. Pechhold
(74) Attorney, Agent, or Firm—Keeling Law Firm

(57) ABSTRACT

A slip base support system for tubular posts. The post supporting a highway sign or other highway roadside device is held in a casting that has a triangular, multi-directional base plate. The base plate mates with a similar shaped ground plate, and the two plates are held together with bolts oriented in notches in the apexes of each triangle. Upon impact by a vehicle, the post and support casting break away from the ground plate by ejecting one or more of the bolts laterally from the notches. The post is held within the casting after impact by an internal locking pin, which is retained within the post by grommets, thus minimizing the projectile missiles after impact. To facilitate breakaway, two sheets of galvanized steel having a low coefficient of friction are positioned between the base plate and ground plate. After impact, nearly all parts of the system, including the post, casting, ground plate and bolts, are able to be re-used.

25 Claims, 3 Drawing Sheets

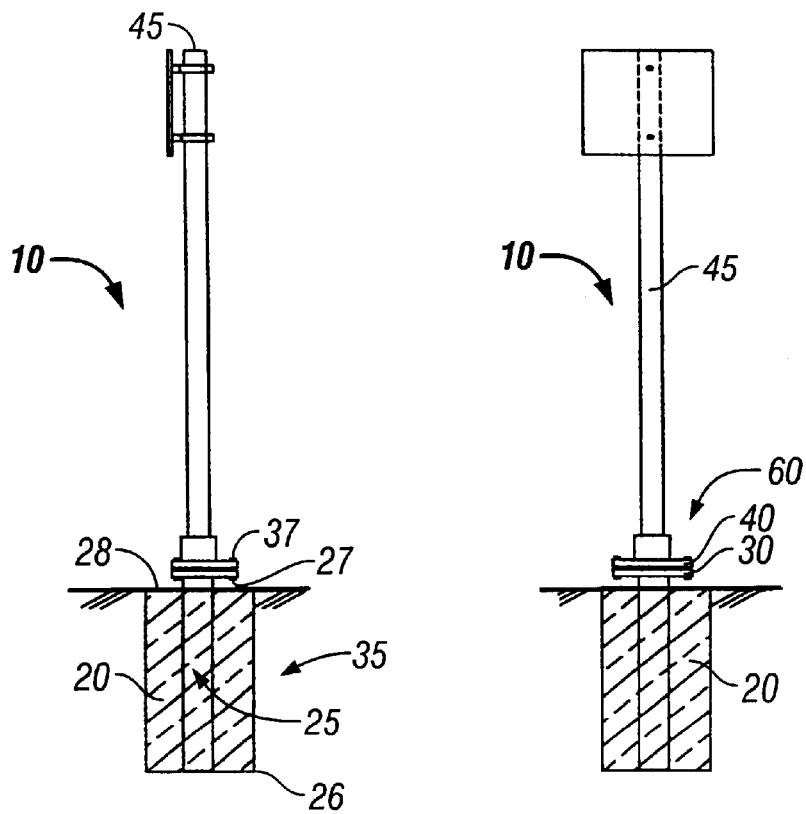
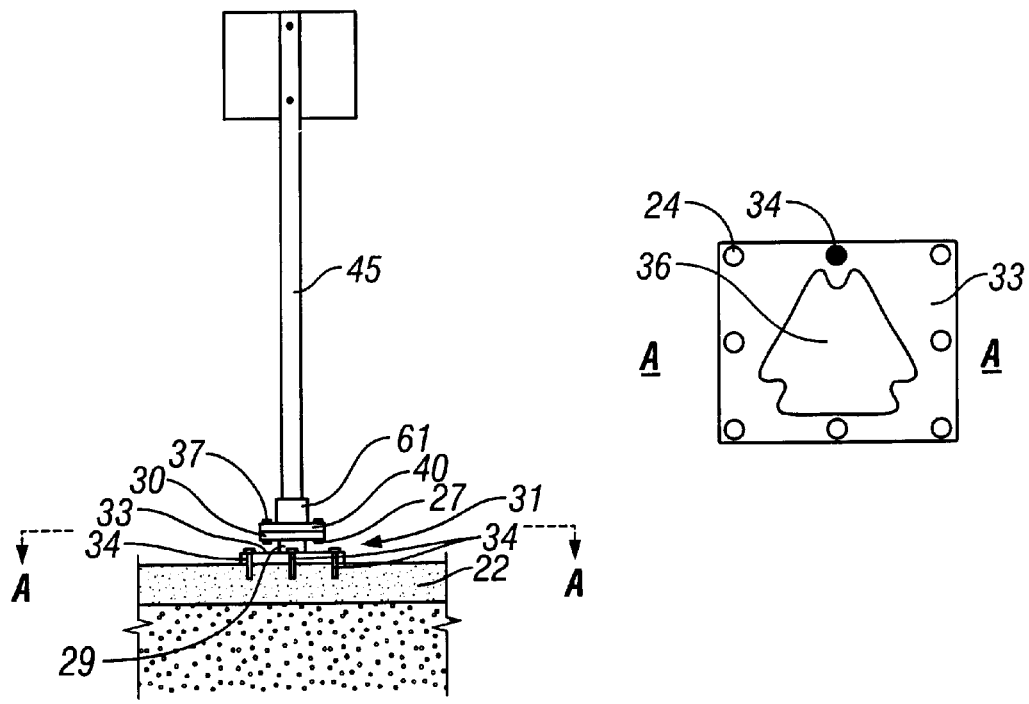
FIG. 1-A
FIG. 1-B

BREAKAWAY POST SLIPBASE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of Invention

This invention relates to a slip base support for tubular posts. Specifically, the invention describes a slip base unit having a casting which includes a triangular, multi-directional base plate and an integral coupler which secures a support post using an internal locking pin.

2. Related Art

Roadside signs can pose a serious safety hazard to motorists. Signs located next to roads pose potential collision points of impact for vehicles. Effective breakaway devices for roadside signs and light pole supports are necessary to achieve the highest levels of highway safety. Therefore, the U.S. Department of Transportation's Federal Highway Administration (FHWA) policy requires that all roadside sign and light pole supports used on the National Highway System meet the performance criteria contained in the National Cooperative Highway Research Program (NCHRP) Report 350,*Recommended Procedures for the Safety Performance Evaluation of H (Report* 350). Similarly, State transportation agencies have similar performance criteria for roadside sign and light pole supports. Report 350 was prepared based on research sponsored by the American Association of State Highway and Transportation Officials (AASHTO) in cooperation with the FHWA, and outlines the required criteria for breakaway or yielding supports for signs and luminaries. The three primary appraisal factors for evaluating crash test performance are 1) structural adequacy, 2) occupant risk, and 3) after-collision vehicle trajectory.

Structural adequacy relates to the support's ability to break away or yield after impact in a predictable manner. The support structure must be able to break away cleanly without undue deformation or any shattering.

Occupant risk relates to the degree of hazard to which occupants in the impacting vehicle would be subjected. Occupant risk is evaluated by the degree of i) detached elements from the support, ii) vehicle rollover, iii) occupant impact velocities, iv) occupant ridedown accelerations, and v) change in vehicle velocity.

Detached elements, fragments or other debris from the sign support structure should not penetrate or show potential for penetrating the occupant compartment of the vehicle, or present an undue hazard to other traffic, pedestrians, or personnel in a work zone. Deformation of, or intrusions into, the occupant compartment that could cause serious injuries should not be permitted. Thus, fragments and components, including connectors, of the sign support system may become dangerous flying projectiles. Units that have unrestrained components, including fasteners and subcomponents, pose a higher number of potential missiles.

Vehicle rollover should not be caused by impact with the sign structure. Systems that have posts that shatter upon impact, creating tire puncture hazards and flipping poles under the vehicle, may pose a rollover hazard.

Occupant impact velocity is the speed at which an unrestrained passenger strikes some part of the vehicle interior such as the instrument panel, window, or door after the vehicle impacts a fixed or moveable object. The maximum allowable occupant impact velocity is 16.40 f.p.s. (5 m/s), with 9.84 f.p.s. (3 m/s) being the preferable maximum. Like occupant ridedown acceleration and change in vehicle velocity, this factor is primarily influenced by the amount of lateral force required to disengage the sign post from its base mounting structure.

Occupant ridedown acceleration is the highest lateral and longitudinal component of resultant vehicular acceleration averaged over any 10-ms interval for the collision pulse subsequent to occupant impact. Occupant ridedown acceleration is a function of the initial change in velocity (acceleration) of the occupant relative to the vehicle immediately after the vehicle impacts a fixed or moveable object. The maximum allowable ridedown acceleration is 20g's, with 15g's being the preferred maximum allowable ridedown acceleration.

Change in vehicle velocity is based on the change in velocity of an 1800# (816.5 kg) vehicle immediately after striking a breakaway support at speeds of 20 mph to 60 mph (32 kmph to 97 kmph). The maximum allowable change in velocity is 16 fps (4.87 mps), but preferably does not exceed 10 fps (3.05 mps).

After-collision vehicle trajectory is a measure of the potential of the post-impact trajectory of the vehicle to cause a subsequent multi-vehicle accident. After collision it is preferable that the vehicle's trajectory not intrude into adjacent traffic lanes. This factor is influenced primarily by the ease with which the sign post breaks away from its base mounting.

To address these and similar safety parameters for crash sign supports, numerous designs have been introduced. Most prior art describes signs that collapse upon impact, but do not "break away". For example, Hugron (U.S. Pat. No. 5,160,111 —Nov. 3, 1992) describes a collapsible signal post having an insert tube connecting a base post and a sign post. The replaceable tubular insert has a helical cut, which allows the top post to bend upon impact. Deficiencies in this design include the non-reusable nature of the tubular insert, due to designed deformation upon impact, making the system expensive to repair/replace. Daggs et al. (U. S. Pat. No. 4,565,466 —Jan. 21, 1986) discloses a spring loaded return jointed sign post pedestal. The sign post mates with a fluted bell, which prevents rotation. Deficiencies include the inability to replace the sign post without replacing the attached base post, since the strength of the spring must be such that field reattachment of the sign and base posts is not practical. Miller (U. S. Pat. No. 2,141,067 —Dec. 20, 1938) utilizes a spring loaded lightweight post. However, this design lacks the ability to support a large sign, due to strength limitations of the spring and its connections.

A commonly used breakaway system is described by Nehls (U.S. Pat. No. 4,926,592 —May 22, 1990). The device has four main components: a ground engaging mounting post, a pedestal mounting member, a support post mounting member, and a support post for the sign. The ground engaging mounting post is buried in the ground, typically embedded in concrete. The pedestal mounting member, with a triangular plate at one end and a shaft at the other, slides its shaft within the ground engaging mounting post, where it is bolted. The support post mounting member also has a triangular plate at one end, and a vertical standard, typically elongated C-channels that form an open sided square cross-section. The triangular plate of the support post mounting member bolts to the triangular plate of the pedestal mounting member, such that there is a bottom plate (connected to the ground support) and a top plate (for connection to the sign post). The support post holding the sign is slid within the C-channels of the support post mounting member, and the post and channels are bolted together. It essential that the C-channels be bolted tightly against the sign post, which has multiple pre-drilled holes for bolt alignment. The triangular plates have notches in their apexes, through which cam bolts are fastened, securing the top plate to the bottom plate. The cam bolts each have a pair of cam rollers around the shaft of the bolt. The first roller is rollable across the interior of a notch of the support post triangular plate/flange, and the second cam is rollable across the interior of a notch if the pedestal mounting triangular plate/flange. When a vehicle strikes the sign post, the top plate slides off the bottom plate, and the cam bolts are ejected laterally out of the notches as the cams rotate. A friction reducing gasket, preferably made of TEFLON, is between the two triangular plates to facilitate the sliding movement of the top plate off the bottom plate. Deficiencies in the Nehls design include the bolting system of the sign post to the post mounting member, the securement of the C-channels to the triangular plate, the friction reducing gasket.

One disadvantage of the Nehls '592 system relates to the bolting system of the sign post. The system is designed to be used on posts having multiple holes, which facilitate telescoping. Exposed bolts firmly attach the sign post to the C-channels to a tightness level sufficient to eliminate any yield or take up that could occur upon impact, which would add to the breakaway force of the coupling. This connection system poses three problems. First, the exposed bolts are subject to rusting and/or locking up due to environmental exposure. Thus, replacing the sign post within the C-channels is difficult if not infeasible. Second, when the sign post is impacted by a vehicle, the exposed nuts, bolts and washers are free to fly forward, creating projective missile hazards. Third, if mounted transversely to the point of vehicle impact, the bolts form a pivot point about which the sign support may rotate, pressing against the base of the C-channels causing the C-channel welds to the triangular base to fail.

The C-channels are so shaped to afford water drainage away from the sign post. Thus, there must be an open side for the C-shape. Casting such a device is not technologically and economically feasible, thus the C-channels must be welded to the triangular plate. This poses a weak connection, and a source of failure upon vehicular impact. When the weld breaks, the triangular plate and C-channel pieces add to the protective missile debris with the bolts, nuts and washers.

The effectiveness of the friction reducing plate of the Nehls '592 patent is also limited. Because of the opening in the middle of the TEFLON friction reducing gasket, there is a strong likelihood that upon impact there will be direct metal-to-metal contact between the top triangular plate and the bottom triangular plate. This is typical where the triangular plate rotates upward in the front of the plate due to rotational torque about the sign post upon vehicular impact, causing the back portion of the top plate to drag across the unprotected portion of the bottom plate. Likewise, a crack in the side of the TEFLON gasket can allow the gasket to degrade from water seepage, dramatically reducing its friction reducing capability.

To reduce the amount of force required to break away the coupling, Nehls '592 requires the use of roller cams around the coupling connector bolts. These cams roll, typically in opposite directions, across the notch surfaces in the upper and lower flanges of the coupler. The present invention does not typically use such cams, and still outperforms the Nehls '592 design, as shown in Table 1:

TABLE 1

| Vehicle Velocity Change | | |
| --- | --- | --- |
| Vehicle velocity at impact | ~20 mph | ~60 mph |
| Nehls '592 system | 10.4 f.p.s. | 6.0 f.p.s. |
| Present invention | 2.46 f.p.s. | 2.64 f.p.s. |

Source: USDOT-FHA May 1, 1991 correspondence to Unistrut Corporation; Texas Transportation Institute NCHRP Report 350 Evaluation of the Northwest Sign Company Slip Sign Support for Square Posts, April 2000.

Under similar test conditions, the present invention breaks away with much less force than found in the prior art described by Nehls '592, resulting in less vehicle velocity change after impact, thus resulting in less internal momentum change on occupants.

It would therefore be a useful improvement of the prior art for a sign support slipbase system to smoothly disengage from a ground support upon impact from a vehicle, with a minimum of projective missiles ejected from the disengaged system.

BRIEF SUMMARY OF THE INVENTION

Accordingly, the objectives of this invention are to provide, inter alia, a new and improved breakaway post slipbase that:
 easily breaks away from a ground stub base upon impact from a vehicle;
 confines connection hardware after impact;
 is resistant to harsh environments;
 affords reuse of the post; and
 is cost efficient.

These objectives are addressed by the structure and use of the inventive breakaway post slipbase. A base stub is embedded in the ground, typically within a concrete footing, which is buried such that the base stub extends approximately 3" above the ground, terminating at a triangular ground stub base flange. A slip base casting receives a post, typically a thin walled square tubing, such as a sign post. The slip base casting also has a triangular flange, which bolts to the ground base stub flange with flange bolts that pass though corresponding notches in each of the apexes of both triangles. A bolt keeper plate, which is a triangular shaped sheet of thin metal, restricts and aligns the bolts within the notches, maximizing contact area with the flanges, and preventing bolt "creep" over time from vibration and other forces caused by wind and the environment against the supported sign or device. The bolt keeper plate also provides a solid slick surface for a slip plate to slide across during breakaway. This slip plate is secured to the slip base casting by a locking pin, which is inside the slip base casting. The locking pin also has a primary function, which is to secure the sign post to the slip base casting. The locking pin preferably has retaining grommets, to keep the pin in place after impact, thus holding together as one unit the post, slip plate and slip base casting, preventing the pin from becoming a projectile. The design affords smooth breakaway of the coupling between the base stub and slip base casting, such that typically the post, casting, locking pin, grommets and even flange bolts can be reused after breakaway.

Other objects of the invention will become apparent from time to time throughout the specification hereinafter disclosed.

BRIEF DESCRIPTION OF THE DRAWINGS

FIG. 1-A depicts a view of the post slipbase system installed in the ground.

FIG. 1-B depicts an alternate embodiment of the post slipbase system installed on a surface mount plate.

DETAILED DESCRIPTION OF THE INVENTION

The present invention is described in post slipbase system 10.

As seen in FIG. 1-A, post slipbase system 10 includes tubular post 45, which slides and locks into slip base casting 60, which is bolted to ground stub base 35, which is embedded in the ground. While post slipbase system 10 is depicted in FIG. 1-A as a single stand-alone unit having a single vertical tubular post 45, it is understood that post slipbase system 10 may be used in multiple units to support wide signs, barricades, warning devices and similar roadway devices. Further, tubular post 45 may have a "Y", trident or other shape extending from a single base pole.

Figure 2:
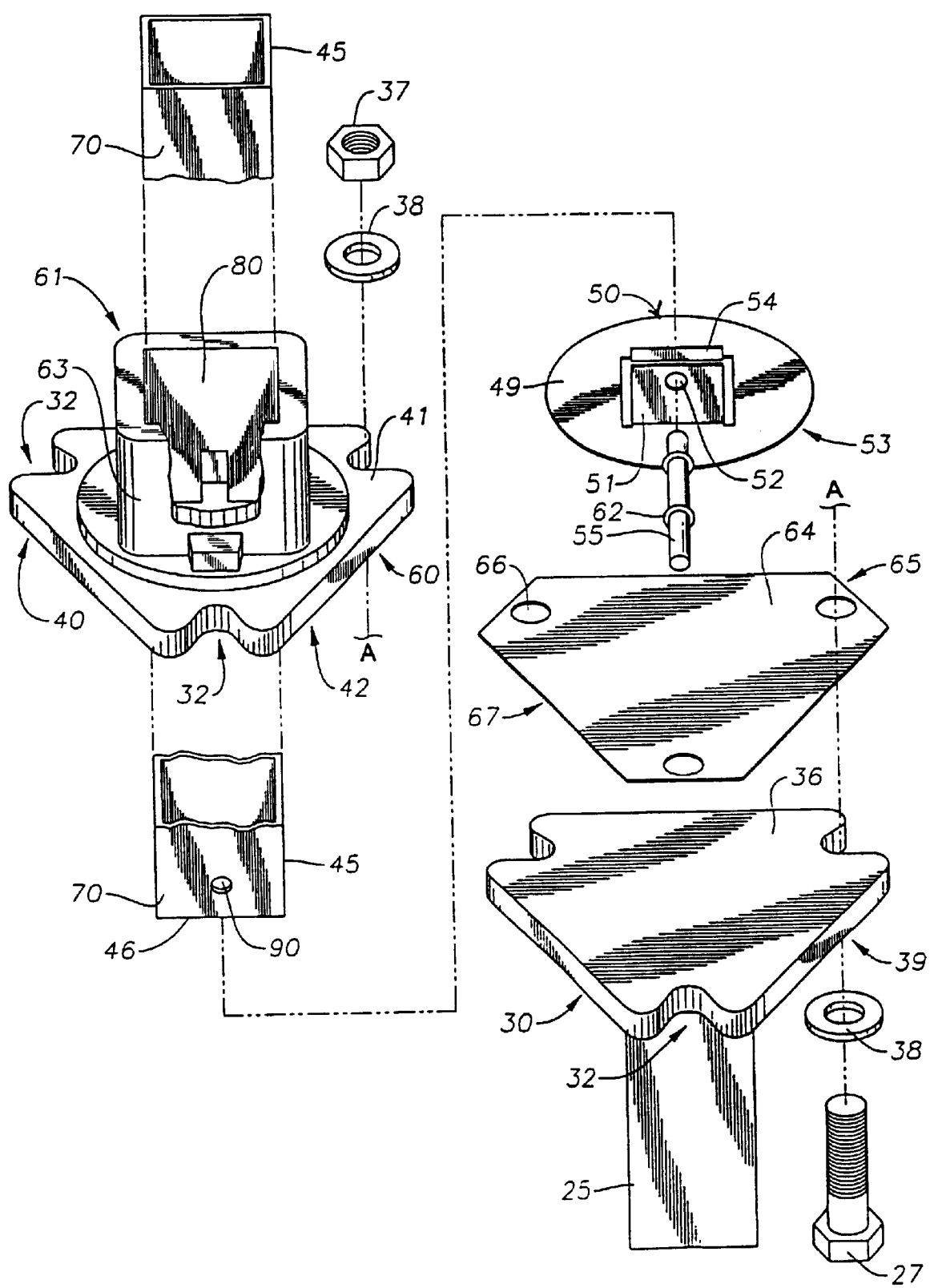
FIG. 2 depicts a detailed exploded view of the slipbase system.

Ground stub base 35 comprises base stub 25 and base stub flange 30, which is connected, typically via welding, to one end of base stub 25. Base stub 25 is embedded in the ground, preferably at least 33" deep and preferably adheringly set in concrete footing 20, which is flush with the ground. Alternatively, stub base 25 may be attached, typically by bolts and nuts, to an outer sleeve (not shown) which is embedded in the ground, with or without a concrete surrounding support base. Base stub flange 30 is preferably positioned such that base stub flange top surface is 3" above ground level. The shape of base stub flange top surface 36 is shown in FIG. 2. It is generally triangular shaped, with notches in each apex of the triangle to receive flange bolts 27.

Alternatively, slip base flange 40 may be bolted to surface mount assembly 31. Surface mount assembly 31 includes base stub flange 30, which is normal to and connected to (typically via fillet welding) surface mount stub 29, which is normal to and connected to (typically via fillet welding) surface mount plate 33. Surface mount plate 33 is secured to concrete topping 22 such that the lower surface of surface mount plate 33 is contiguous to the top surface of concrete topping 22. Concrete topping 22 may be a sidewalk, roadway or other surface. The surface is preferably concrete to adequately secure the connection, although asphalt and other surfaces may be used if adequate connectors are used to connect surface mount plate 33 to the surface. If concrete topping 22 is pre-existing (set), the preferred method of connecting surface mount plate 33 to concrete topping 22 is by drilling holes into concrete topping 22, and then driving wedge anchor bolts 34 into the drilled holes such that wedge anchor bolts 34 are aligned to pass upwards through plate holes 24 of surface mount plate 33. Nuts 37 (not shown in FIG. 1-B) attach to wedge anchor bolts 34 to secure surface mount assembly 31 to the surface of concrete topping 22.

Details of the preferred embodiment of post slipbase system 10 are shown in exploded view in FIG. 2. Base stub flange 30, including base stub flange top surface 36 and stub base flange undersurface 39, is normal to the axis of base stub 25. Superposed on base stub flange top surface 36 is bolt keeper plate 65. Bolt keeper plate 65 has the same general triangular dimensions as base stub flange top surface 36, except notches 32 are replaced with keeper plate bolt holes 66. In the preferred embodiment, bolt keeper plate 65 is constructed of 30 gauge galvanized steel, or similar material with a low coefficient of friction and high tensile strength. Bolt keeper plate 65 thus covers base stub flange top surface 36, with keeper plate bolt holes 66 affording passage of flange bolts 27.

Superposed and generally centered on bolt keeper plate 65 is slip plate 50. Slip plate 50 is preferably constructed of 30 gauge galvanized steel, or similar material having a low coefficient of friction and high tensile strength. Slip plate 50 is secured against slip base flange bottom surface 42, and is held in place by locking pin 55 through securement tab hole 52. As described below, locking pin 55 is held within tubular post 45 through post sidewall holes 90. The perimeter shape and dimensions of slip base flange bottom surface 42 are the same triangular shape with apex notches 32 as found on base stub flange top surface 36.

Figure 3:
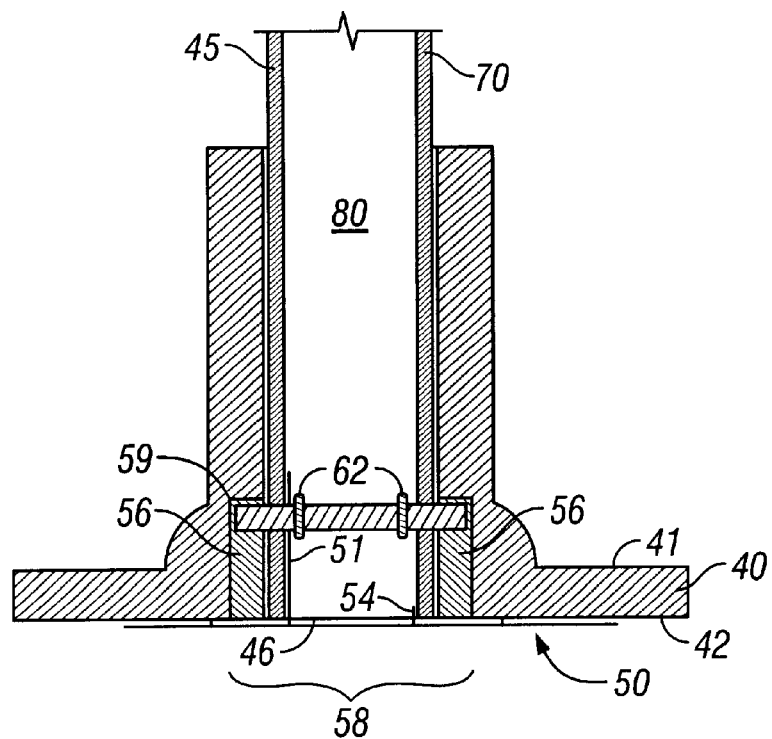
FIG. 3 depicts a cross section of the slip base casting with a post secured using a locking pin.
Figure 4:
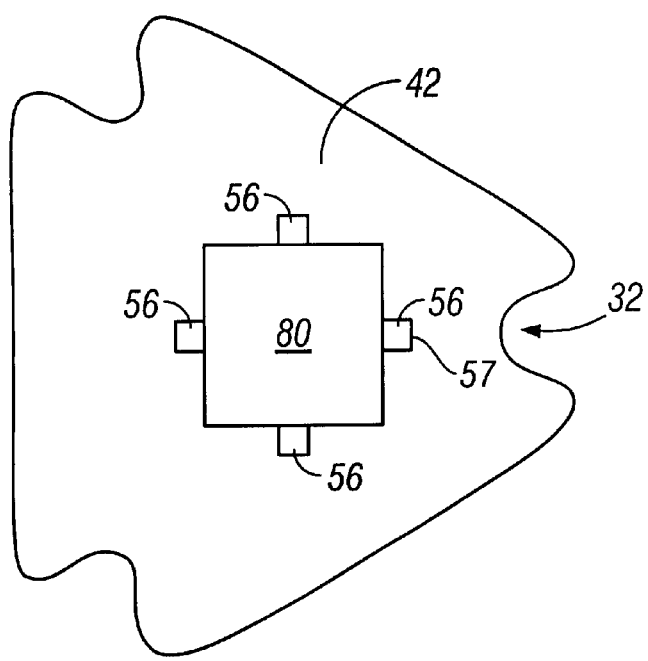
FIG. 4 depicts a bottom view of the slip base casting without the post or locking pin.

As seen in FIGS. 3 and 4, slip base casting 60 includes upper post support 61; cavity 80, which extends the entire vertical length of the interior of slip base casting 60; and at least one pin channel 56, which extends from slip base flange bottom surface upward in the interior of slip base casting 60, terminating in the lower section of the interior. The diameter of cavity 80 is slightly larger than the outer diameter of post 45, particularly the first end of post 45 than is inserted into cavity 80. The cross section of cavity 80 is generally the same shape as the cross section of post 45, such that the first end of post 45 mates smoothly when slid into cavity 80. In the preferred embodiment, the cross section of post 45 and cavity 80 is a square. Alternatively, this cross section may be any circular, oval or polyhedral shape.

Channel width 57 is slightly larger than the diameter of locking pin 55 and channel length 58 is slightly longer than the length of locking pin 55, affording the ends of locking pin 55 the ability to slide transversely into pin channel 56 when oriented within tubular post 45. Locking pin 55 is secured transversely to tubular post 45 by grommets 62 circumferential positioned about locking pin 55. A first grommet 62 is oriented adjacent one side of the interior surface of tubular post 45, and a second grommet 62 is oriented adjacent the interior surface of slip plate securement tab 51, such that slip plate securement tab 51 is pressing against an opposite side of the interior surface of tubular post 45. In the preferred embodiment, post sidewall holes 90 are located on opposing sides of tubular post 45, and at a distance from post end 46 such that the distance from the top edges of post sidewall holes 90 to post end 46 is just slightly more (preferably ¹⁄₁₆") than channel depth 59. Thus, when slip base casting 60 slides down over tubular post 45, the ends of locking pin 55 are pressed against the top ends of pin channels 56. As seen in FIG. 3, locking pin 55 secures slip plate securement tab 51 between grommet 62 and the interior wall of tubular post 45, grommets 62 keep locking pin 55 secured to tubular post 45, and locking pin 55 against the top ends of pin channels 56 prevents upward movement of tubular post 45. In the preferred embodiment, tubular post 45 is a square post 70, each exterior side of the square being approximately 2½".

As seen in FIG. 4, slip base casting 60 preferably has four pin channels 56, each subsequent pin channel 56 offset by 90°, such that there are two pairs of pin channels 56, each pair having two pin channels 56 aligned in the same plane, and the second pair of pin channels 56 being aligned perpendicular to the first pair. This orientation allows post 45 to be rotated 90° before final assembly, affording the installer the option of facing the sign attached to post 45 in any of four directions (by rotating post 45 and by mounting the sign on one side or the other of rotating post 45). Alternatively, slip base casting 60 may have as few as one pin channel 56, if only one end of locking pin 55 is used to secure post 45 to slip base casting 60.

As its name implies, slip base casting 60 is preferably constructed by metal casting techniques. Alternatively, slip base casting 60 may be manufactured by any metalworking technique known in the art, including welding together components to arrive at the final product depicted as slip base casting 60.

The slip base flange 40 of slip base casting 60 bolts to base stub flange 30. Flange bolts 27 bolt to nuts 37, with washers 38 circumferential to the shaft of flange bolts 27 and adjacent the bolt head of flange bolts 27 and nuts 37. Thus washers 38 are adjacent stub base flange under surface 39 and slip base flange top surface 41 when flange bolts 27 are tightened down on nuts 37. To prevent flange bolts 27 from "creeping" out of notches 32, each bolt passes through keeper plate bolt hole 66 of bolt keeper plate 65, which is between slip base flange 40 and base stub flange 30. Thus, each flange bolt 27 is oriented within a notch 32 of slip base flange 30, a keeper plate bolt hole 66 of bolt keeper plate 65, and a corresponding notch 32 of base stub flange 30. When flange bolts 27 are tightened down, base stub flange top surface 36 presses against bolt keeper plate bottom surface 67, and bolt keeper plate top surface 64 presses against slip plate bottom surface 53, and slip plate top surface 49 presses against slip base flange bottom surface 42. In the preferred embodiment, flange bolts 27 are standard bolts, defined as not having cam rollers such as those described in the Nehls U.S. Pat. No. 4,926,592.

Post end 46 rests against slip plate top surface 49, and tubular post 45 is held within cavity 80 of slip basecasting 60 by locking pin 55 being snug against the top end of pin channels 56.

OPERATION

The preferred installation of post slipbase system 10 is as follows. First, a 12" or 14" diameter hole 33" deep is drilled for concrete footing 20. Soft soil may require a, larger diameter hole. The hole is filled with concrete, and base stub 25 is pressed into the hole so that base stub flange top surface 36 is a maximum of 3" above the ground. Base stub flange 30 is aligned so that a flat edge of base stub flange 30 is facing on-coming traffic. Base stub flange top surface 36 should be level and, if used together. with additional post slipbase systems 10, should typically be at the same elevation as the other. base stub flange top surfaces 36. Slip base casting 60 is slid up around tubular post 45 so that post end 46 and post sidewall holes 90 are accessible. Slip plate securement tab 51 is inserted inside tubular post 45. Locking pin 55 is slid through a first post sidewall hole 90, and both grommets 62 are pushed around locking pin 55. Locking pin 55 is then pushed through securement tab hole 52 and then through a second post sidewall hole 90 such that equal lengths of locking pin 55 are protruding outside tubular post 45. Grommets 62 are then slid outward against the interior walls of tubular post 45, securing locking pin 55 in position. Slip base casting 60 is then slid down with locking pin 55 sliding up pin channels 56, leaving about 1/16" of tubular post 45 protruding below slip base flange bottom surface 42. Upper post support 61 provides lateral support to tubular post 45. The sign or other object to be supported by tubular post 45 may optionally be attached at this point.

Flange bolts 27, each having a washer 38, are positioned upward through notches 32 of base stub flange 30, and then through keeper plate bolt holes 66 of bolt keeper plate 65. Slip base casting 60, now attached to tubular post 45 and slip plate 50 by locking pin 55, is placed on top of base stub flange 30 such that slip base flange bottom surface 42 and slip plate bottom surface 53 mate against bolt keeper plate top surface 64, and flange bolts 27 extend up through notches 32 of slip base flange 40. Washers 38 are placed over each flange bolt 27, and nuts 37 secured to each flange bolt 27. Each flange bolt 27 should be tightened to 40 to 80 foot pounds of torque.

When post slipbase system 10 is struck by a vehicle, slip plate 50 slides across bolt keeper plate 65, and one or more flange bolts 27 are ejected out of notches 32 of base stub flange 30 and slip base flange 40, tearing out a small amount of metal around the edge of keeper plate bolt hole 66. Post 45, slip plate 50 and slip base casting 60 remain connected after vehicle impact by locking pin 55. Locking pin 55 remains integral with post 45, slip plate 50 and slip base casting 60 due to the retention afforded by grommets 62. Thus the number of small projectile missiles after vehicular impact is minimal, increasing the safety of the system.

Depending on the speed of the vehicle, after vehicular impact tubular post 45 typically will fly over the vehicle (at high speeds) or will fall to the side of the impacting vehicle (at low speeds). In both cases, all parts are typically undamaged after vehicular impact with post slipbase system 10 except for bolt keeper plate 65, which will have at least one edge next to a keeper plate bolt hole 66 torn out as at least one flange bolt 27 ejects out of a notch 32. Typically, even flange bolts 27 are able to be re-used after impact. Thus post slipbase system 10 provides a very economical breakaway sign system causing minimal damage both to post slipbase system 10 as well as the striking vehicle.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

I claim:

1. A breakaway post slipbase system for use with a ground stub base, comprising:

a slip base casting;

said slip base casting comprising a slip base flange and an upper post support;

said slip base flange having a slip base flange bottom surface;

said upper post support extending upward and normal to said slip base flange;

a longitudinal cavity extending through said slip base casting;

said longitudinal cavity defined by an interior surface of said slip base casting;

at least one pin channel offset to said cavity;

said at least one pin channel having a channel depth;

said at least one pin channel extending from said slip base flange bottom surface to said channel depth;

a locking pin having two locking pin ends;

a tubular post having a first end and a second end;

said tubular post first end being interposed within said longitudinal cavity of said slip base casting;

said locking pin oriented transverse to and through at least one hole in a side of said tubular post first end; and at least one of said locking pin ends extending into said at least one pin channel and being generally flush against a channel end defined by said channel depth, such that said tubular post first end is prevented from sliding upward out of said cavity and disengaging from said slip base casting.

2. The breakaway post slipbase system as in claim 1, further comprising:

said longitudinal cavity having a longitudinal cavity square cross-section;

said tubular post first end having a post square cross section; and said post square cross section being slightly smaller than said longitudinal cavity square cross section.

3. The breakaway post slipbase system as in claim 1, farther comprising:

at least one retaining grommet; and said at least one retaining grommet oriented circumferentially about said locking pin.

4. The breakaway post slipbase system as in claim 3, further comprising:

said at least one retaining grommet comprising a first grommet and a second grommet;

said first grommet oriented against an interior wall defining said longitudinal cavity; and said second grommet oriented against a slip plate securement tab.

5. The breakaway post slipbase system as in claim 1, further comprising:

said at least one pin channel comprising four pin channels;

said interior surface of said slip base casting having four equal sides;

said interior surface defining said longitudinal cavity having a square cross section having four equal sides;

each said pin channel oriented offset from a different said equal side of said interior surface.

6. The breakaway post slipbase system as in claim 1, said upper post support having a longitudinal length in the range of 2" to 8".

7. A breakaway post slipbase system for use with a ground stub base, comprising:

a slip base casting:

said slip base casting comprising a slip base flange and an upper post support;

said slip base flange having a slip base flange bottom surface;

said upper post support extending through said slip base casting;

said longitudinal cavity extending through said slip base casting;

said longitudinal cavity defined by an interior surface of said slip base casting;

at least one pin channel offset to said cavity;

said at least one pin channel extending from said slip base flange bottom surface to said channel depth;

a locking pin having two locking pin ends;

a tubular post having a first end and a second end;

said tubular post first end being interposed within said longitudinal cavity of said slip base casting;

said locking pin oriented transverse to and through at least one hole in a side of said tubular post first end;

at least one of said locking pin ends extending into said at least one pin channel and being generally flush against a channel end defined by said channel depth, such that said tubular post first end is prevented from sliding upward out of said cavity and disengaging from said slip base casting;

a slip plate having a slip plate top surface and a slip plate bottom surface;

said slip plate top surface being oriented contiguous to said slip base flange bottom surface;

a bolt keeper plate having a bolt keeper plate top surface and a bolt keeper plate bottom surface;

said bolt keeper plate top surface being oriented contiguous to said slip plate bottom surface;

said ground stub base comprising a base stub and a base stub flange;

said base stub extending downward into a supporting medium and normal to said base stub flange;

said base stub flange having a top surface;

said bolt keeper plate bottom surface oriented superposed and contiguous to said base stub flange top surface; and a means for connecting said slip base flange and said base stub flange.

8. The breakaway post slipbase system as in claim 7, further comprising said slip base flange and said base stub flange each having a triangular shape of approximately the same dimensions, said triangular shape having three apexes.

9. The breakaway post slipbase system as in claim 8, further comprising each said triangular shape apex having a notch of adequate dimension to receive a transversely oriented bolt.

10. The breakaway post slipbase system as in claim 9, said means for connecting said slip base flange and said base stub flange comprising a plurality of bolts connected to a plurality of nuts.

11. The breakaway post slipbase system as in claim 10, said plurality of bolts being standard bolts.

12. The breakaway post slipbase system as in claim 7, further comprising:

said slip plate further comprising a slip plate securement tab and a slip plate positioning tab;

said slip plate securement tab comprising a securement tab hole;

said slip plate securement tab and said slip plate positioning tab oriented within said longitudinal cavity; and said locking pin securing and oriented through said securement tab hole such that said slip plate top surface is adjacent said slip base flange bottom surface.

13. The breakaway post slipbase system as in claim 7, said supporting medium being a dirt surrounding a hole in a ground.

14. The breakaway post slipbase system as in claim 7, said supporting medium being a concrete in a hole in a ground.

15. A The breakaway post slipbase system as in claim 7, said supporting medium comprising an outer sleeve being buried in a hole in a ground.

16. The breakaway post slipbase system as in claim 15, said outer sleeve being embedded in a concrete in said hole in said ground.

17. The breakaway post slipbase system as in claim 9, further comprising: said longitudinal cavity having a longitudinal cavity square cross-section;

said tubular post first end having a post square cross section; and said post square cross section being slightly smaller than said longitudinal cavity square cross section.

18. The breakaway post slipbase system as in claim 7, further comprising:
at least one retaining grommet; and
said at least one retaining grommet oriented circumferentially about said locking pin.

19. A breakaway post slipbase system, comprising:
a slip base casting;
said slip base casting comprising a slip base flange and an upper post support;
said slip base flange having a slip base flange bottom surface;
said upper post support extending upward and normal to said slip base flange;
a longitudinal cavity extending through said slip base casting;
at least one pin channel offset from said cavity;
said at least one pin channel having a channel depth;
said at least one pin channel extending from said slip base flange bottom surface to said channel depth;
a locking pin having two locking pin ends;
a tubular post having a first end and a second end;
said tubular post first end being interposed within said longitudinal cavity of said slip base casting;
said locking pin oriented transverse to and through at least one hole in a side of said tubular post first end;
at least one of said locking pin ends extending into said at least one pin channel and being generally flush against a channel end defined by said channel depth, such that said tubular post first end is prevented from sliding upward out of said cavity and disengaging from said slip base casting;
a slip plate having a slip plate top surface and a slip plate bottom surface;
said slip plate top surface being oriented contiguous to said slip base flange bottom surface;
a bolt keeper plate having a bolt keeper plate top surface and a bolt keeper plate bottom surface;
said bolt keeper plate top surface being oriented contiguous to said slip plate bottom surface;
a surface mount assembly comprising a base stub flange, a surface mount stub having a surface mount stub first end and a surface mount stub second end, a surface mount plate and a means of ground attachment;
said base stub flange being normal to and attached to said surface mount stub first end;
said surface mount plate being normal to and attached to said surface mount stub second end;
said base stub flange having a top surface;
said bolt keeper plate bottom surface oriented superposed and contiguous to said base stub flange top surface; and
a means for connecting said slip base flange and said base stub flange.

20. The breakaway post slipbase system as in claim 19, further comprising:
said slip base flange and said base stub flange each having a triangular shape of approximately the same dimensions;
said triangular shape having three apexes; and
each said triangular shape apex having a notch of adequate dimension to receive a transversely oriented bolt.

21. The breakaway post slipbase system as in claim 19, further comprising:
said longitudinal cavity having a longitudinal cavity square cross-section;
said tubular post first end having a post square cross section; and
said post square cross section being slightly smaller than said longitudinal cavity square cross section.

22. The breakaway post slipbase system as in claim 19, further comprising:
at least one retaining grommet;
said at least one retaining grommet oriented circumferentially about said locking pin;
said at least one retaining grommet comprising a first grommet and a second grommet;
said first grommet oriented against a first interior wall of said tubular post first end;
said second grommet oriented against a slip plate securement tab; and
said slip plate securement tab oriented against a second interior wall of said tubular post first end.

23. A breakaway post slipbase system for use with a ground stub base, comprising:
a slip base casting;
said slip base casting comprising a slip base flange and an upper post support;
said slip base flange having a slip base flange bottom surface;
said upper post support extending upward and normal to said slip base flange;
a longitudinal cavity extending through said slip base casting;
said longitudinal cavity defined by an interior surface of said slip base casting;
at least one pin channel offset to said cavity;
said at least one pin channel having a channel depth;
said at least one pin channel extending from said slip base flange bottom surface to said channel depth;
said at least one pin channel having a channel length;
a locking pin shorter than said channel length;
said locking pin having two locking pin ends;
a tubular post having a first end and a second end;
said tubular post first end being interposed within said longitudinal cavity of said slip base casting;
said locking pin oriented transverse to and through at least one hole in a side of said tubular post first end; and
at least one of said locking pin ends extending into said at least one pin channel and being generally flush against a channel end defined by said channel depth, such that said tubular post first end is prevented from sliding upward out of said cavity and disengaging from said slip base casting.

24. The breakaway post slipbase system as in claim 23, further comprising:
said longitudinal cavity having a longitudinal cavity square cross-section;
said tubular post first end having a post square cross section; and
said post square cross section being slightly smaller than said longitudinal cavity square cross section.

25. The breakaway post slipbase system as in claim 23, further comprising:
at least one retaining grommet; and
said at least one retaining grommet oriented circumferentially about said locking pin.

* * * * *